United States Patent Office
3,525,751
Patented Aug. 25, 1970

1

3,525,751
HORMONAL DIPHENYL METHYLOL AND
BENZHYDRYLIDENE DERIVATIVES
John H. Fried, Palo Alto, Calif., assignor to Syntex Corporation, Panama, Panama, a corporation of Panama
No Drawing. Filed Mar. 27, 1967, Ser. No. 625,963
Int. Cl. C07d 73/00, 79/00, 89/10
U.S. Cl. 260—327                              10 Claims

ABSTRACT OF THE DISCLOSURE 1,3-dithiane, 1,3,5-trithiane, 5-substituted 1,3-dithianes, N-substituted 1,3,5-dithiazines, and 1,3,5-oxadithiane substituted with di(p-hydroxyphenyl)methylol 4′,4″-dihydroxy benzhydrylidene, or the ethers thereof, at the carbon atom adjacent to the two sulfur atoms exhibit antifertility and anti-estrogenic activity. They are prepared from di-p-hydroxy phenyl ketone or the ethers thereof and the appropriate 6-membered monocyclic 1,3-dithia-heterocyclic.

The present invention pertains to novel nonsteroidal compounds possessing pharmacological properties exhibited by steroid hormones. More particular, the present invention pertains to p-substituted diphenyl methylol and benzhydrylidene heterocyclic compounds.

Specifically this invention is directed towards compounds of the formula:

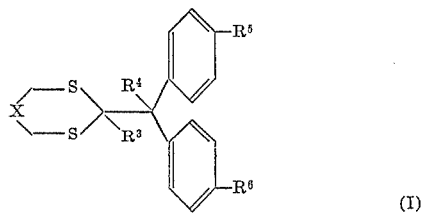

(I)

wherein X is —CHR¹—, —O—, —S—, or —NR²—; wherein R¹ is hydrogen, (lower) alkyl of from 1 to 5 carbon atoms, or phenyl; R² is (lower)alkyl or benzyl: R³ is hydrogen; R⁴ is hydroxy; R³ and R⁴ when taken together comprise a carbon-carbon double bond between their adjacent carbon atoms; each of R⁵ and R⁶ is hydrogen, hydroxy, (lower) alkoxy of from 1 to 5 carbon atoms, β-(N,N-dimethylamino) ethoxy, β-(N,N-diethylamino)ethoxy, β-pyrrolidinoethoxy, β-piperazinoethoxy, β-piperidinoethoxy, β-morpholinoethoxy; tetrahydrofuran-2′-yloxy or tetrahydropyran-2′-yloxy.

The compuounds of the present invention demonstrate antifertility, and antiestrogenic activity; thus, the present compounds are useful for the treatment of uterine disorders. The compounds can be utilized to stimulate the release of pituitary gonadetropins and thus are valuable in the treatment of certain types of infertility. The present compounds can be administered by the usual pharmaceutical routes such as orally, or parenterally. They can be administered in solutions, suspensions, syrups, capsules, pills, powders, and the like, in pharmaceutically acceptable compositions. The dosage varies depending upon the condition being treated, the physical condition of the patient, and the like. Generally the dosage is from about 0.05 milligram to 1 milligram per kilogram of the patient's body weight. However, other dosages can be used and the actual dosage administered will be determined by the physician or veterinarian administering it.

The present novel compounds are prepared by several alternative chemical routes. One such chemical route can be illustrated by the following reaction sequence:

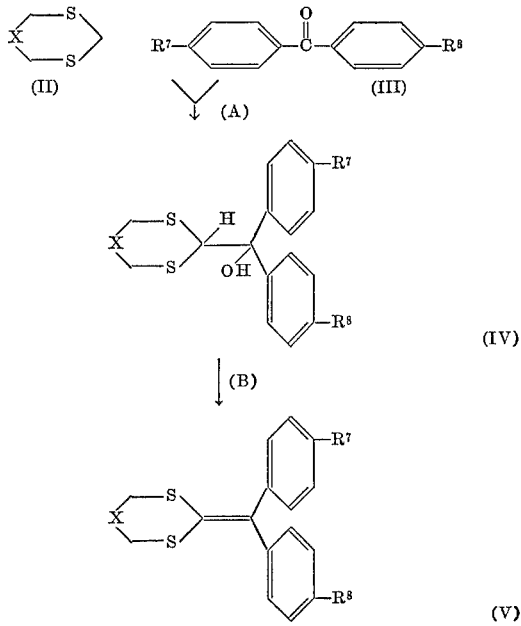

where x is as defined on page 2 and each of R⁷ and R⁸ is (lower) alkoxy of from 1 to 5 carbon atoms, β-(dimethylamino)ethoxy, β(diethylamino)ethoxy, β-pyrrolidinoethoxy, β-piperazinoethoxy, β-piperidinoethoxy, β-morpholinoethoxy, tetrahydrofuran-2′-yloxy, tetrahydropyran-2′-yloxy, methoxymethyleneoxy.

The compounds of Formula IV (compounds of Formula I, where R³ is hydrogen, R⁴ is hydroxy, and R⁵ and R⁶ are other than hydroxy) are prepared by treating the starting material, a compound of Formula II, with a strong alkali metal organic base, preferably an organic lithium compound, such as, butyl lithium, phenyl lithium, and the like, in a dry, inert organic solvent. An excess of the starting material is used to insure that all the organic base reacts. Generally, for every equivalent of the metal organic base used about a 10% to about a 50% excess, normally about a 30% excess, of the starting material is used. Typical inert organic solvents, include hydrocarbons such as hexane, cyclohexane, isooctane, benzene; ethers such as diethyl ether, dioxane, tetrahydrofuran; and the like.

The above mixture is slowly added to a mixture of a p-substituted or unsubstituted diphenyl ketone, a compound of Formula III, and a non-aqueous inert organic solvent such as the solvents described immediately above. At least a molar equivalent of the diphenyl ketone is utilized per equivalent of organic base used in the first step, and generally an excess is utilized. Conveniently equal molar equivalents of Compound II and Compound III are employed. The solvent used in the mixture containing Compound II must be miscible with the solvent used in the mixture containing Compound III.

After the addition, the resulting mixture is allowed to react for a period of time of from about ½ to about 6 hours. Longer reaction periods may be required in some situations, such as when the reaction is conducted at temperatures below 10° C. The addition and reaction are conducted at temperatures of from about 10° C. to about 50° C. conventionally at room temperature. Stirring is optional, but preferred, and is especially preferred during the addition step. The above steps constitute process (A).

A wide variety of starting materials are utilized in the above process. Typical starting materials of Formula II include: 1,3-dithiane, 5-methyl-1,3-dithiane, 5-phenyl-1,3-dithiane, 1,3,5-oxadithiane, 1,3,5-trithiane, N-methyl-1,3,5-dithiazine, and the like. Typical starting materials of Formula III include: di(p-methoxyphenyl)ketone, di(p-ethoxyphenyl)ketone, di(p-methoxy methyleneoxy phenyl)ketone, di(p - [N,N-diethyl-β-aminoethoxy]phenyl)ketone, di(p-tetrahydropyran-2'-yloxyphenyl)ketone, di(p-tetrahydrofuran-2'-yloxyphenyl)ketone, and the like.

The novel compounds of Formula IV are isolated from the reaction mixture by conventional techniques. For example, the reaction mixture is poured into a 1:1 methylene chloride:ice-water mixture and thoroughly mixed. The methylene chloride phase is separated off, washed to neutrality with water, dried and evaporated to dryness under vacuum to yield the product, a compound of Formula IV. The product can be further purified by recrystallization, chromatography, and the like.

The novel compounds of Formula V (compounds of Formula I where $R^3$ and $R^4$ are taken together to form a double bond between their adjacent carbon atoms) are prepared from compounds of Formula IV, which are prepared as described above, by treating the latter with thionyl chloride in the presence of an excess of a tertiary amine. Typical tertiary amines include triethyl amine, pyridine, quinoline, and the like. At least one half molar equivalent of thionyl chloride is used, and generally a molar equivalent is used, per molar equivalent of the starting material of Formula IV employed. A sufficient amount of the tertiary amine is used to keep the reaction media basic at all times. The addition and the reaction are conducted at a temperature of from about 0° to about 50° C., conveniently at room temperature. After the addition, the resulting mixture is allowed to stand for a period of time of from about 30 minutes to about 12 hours. Optionally, a non-aqueous, inert, organic solvent, such as a hydrocarbon like benzene, hexane; an ether like diethyl ether, dioxane, tetrahydrofuran; and the like, is used in conjunction with tertiary amine as a cosolvent. The above step constitutes process (B).

The product, a compound of Formula V, is isolated by conventional techniques. For example, diethyl ether is added to the reaction mixture, it is washed with water and evaporated to yield the product, which can be further purified by conventional techniques such as recrystallization, chromatography, and the like.

During the above principal processes (processes A and B) p-hydroxy groups situated on the phenyl groups of Compounds III, IV or V are protected. If they were not protected they would be attacked by some of the reagents used in the processes. These hydroxy groups are readily protected by etherification prior to the processes. For example, a hydroxy group can be etherified by treating it with chloromethyl methyl ether, and a base such as sodium carbonate, in an inert organic solvent such as acetone to obtain a methoxymethyleneoxy group. By treating a hydroxy group with dihydrofuran or dihydropyran in the presence of an acid, such as p-toluene sulfonic acid, in a nonaqueous, inert organic solvent, such as benzene, hexane, cyclohexane, tetrahydrofuran, dioxane, and the like, the tetrahydrofuran-2'-yloxy or tetrahydropyran-2'-yloxy group is respectively obtained. Other ether groups, such as methoxy, ethoxy, β-pyrrolidinoethoxy, β-piperidinoethoxy are also prepared and employed as protecting groups. At the completion of either of the processes, the ether group can be cleaved by a mild acid hydrolysis to yield the free hydroxy group.

Optionally, the free hydroxy groups can be etherified after hydrolysis. This etherification sequence is generally used when the fiinal ether groups are sensitive or labile to the conditions to processes (A) and (B).

This etherification sequence is often used because it permits the preparation of two or more compounds with a minimum of chemical steps. For example, the methoxymethylene ethers of the p-hydroxy groups are prepared as protecting groups. The etherified compounds are so protected through process A or processes A and B to obtain the compound of Formula IV or V, where $R^7$ and $R^8$ are methoxymethyleneoxy groups. The methoxymethyleneoxy group is then cleaved by a mild acid hydrolysis to yield the free p,p'-dihydroxy compound of Formula I where $R^5$ and $R^6$ are hydroxy groups. A portion of this compound is then etherified to obtain, for example, the p,p'-diethoxy compound of Formula I where $R^5$ and $R^6$ are each ethoxy groups, and another portion is etherified to obtain, for example, the p,p'-di(N,N-diethyl β-amino) ethoxy compound of Formula I where $R^5$ and $R^6$ are each N,N-diethyl β-aminoethoxy groups, and so on and so forth. The p,p'-dihydroxy compound can be divided into any number of portions of any amount and each portion can be etherified with different groups.

The following examples serve to further illustrate and exemplify the present invention and are not, and should not be construed as, limitations of the invention.

PREPARATION 10 grams of p,p'-dihydroxy benzophenone is added to a suspension of 10 grams of chloropropane, 10 grams of sodium carbonate, and 100 ml. of non-aqueous methyl amyl ketone. The mixture is allowed to stand at room temperature for two hours. Methylene chloride, 20 ml., is added; the resulting mixture is washed with water to neutrality, dried over sodium sulfate, and evaporated to dryness to yield p,p'-dipropoxy benzophenone. Similarly, by utilizing N,N-diethyl 2-chloroethylamine in place of 1-chloropropane in the above process, p,p'-di(N,N-diethyl-β-aminoethoxy)benzophenone is obtained.

EXAMPLE I 1,3-dithiane (1.6 g. 13 mmoles) in 10 ml. of tetrahydrofuran is added to a solution of butyl lithium (0.64 g., 10 mmoles) and tetrahydrofuran (10 ml.). The mixture is stirred for 2 hours at room temperature. A mixture of p,p'-dimethoxy benzophenone (2.2 g., 10 mmoles) and 10 ml. of tetrahydrofuran is slowly added to the above mixture with stirring while maintaining the temperature at 25° C. The mixture is stirred for an additional 8 hours; then it is poured into a slurry of 100 ml. of ice water and 100 ml. of methylene chloride. After the mixture has been well shaken, the methylene chloride phase is removed, washed with several portions of water, dried over sodium sulfate and evaporated at vacuum to yield 2-(di[p-methoxyphenyl]methylol)-1,3-dithiane. The product is recrystallized from acetone:ether.

Similarly, 2-(di[p-methoxyphenyl]methylol)-5-methyl-1,3-dithiane, 1-methyl 4-(di[p-methoxyphenyl]methylol)-1,3,5 - dithiazine, 4-(di[p-methoxyphenyl]methylol)-1,3,5-oxadithiane, 2-(di[p - methoxyphenyl]methylol) - 1,3,5-trithiane, are obtained by utilizing 5-methyl-1,3-dithiane, 1-methyl-1,3,5-dithiazine, 1,3,5-oxadithiane and 1,3,5-trithiane respectively in place of 1,3-dithiane in the above process.

By utilizing the same starting materials in the above process, but replacing p,p'-dihydroxy benzophenone with p,p'-di(N,N-diethyl β-aminoethoxy) benzophenone the following are obtained:

2-di[N,N-diethyl β-amino-p-ethoxyphenyl]methylol)-1,3-dithiane,
2-(di[N,N-diethyl β-amino-p-ethoxyphenyl]methylol)-5-methyl-1, 3-dithiane, 1-methyl 4-(di[N,N-diethyl β-amino-p-ethoxyphenyl]
  methylol)-1,3,5-dithiazine,
4-(di[N,N-diethyl β-amino-p-ethoxyphenyl]methylol)-
  1,3,5-oxadithiane, and
2-(di[N,N-diethyl β-amino-p-ethoxyphenyl]methylol)-
  1,3,5-trithiane.

EXAMPLE II

By utilizing p,p'-dimethoxymethyleneoxy benzophenone, p,p'-diethoxybenzophenone, p,p' - di(N,N-dimethyl β-aminoethoxy) benzophenone and p,p'-di(β-morpholinoethoxy)benzophenone in place of p,p'-dimethoxybenzophenone in the process of Example I, the following are respectively obtained:

2-di[p-methoxymethyleneoxyphenyl]methylol)-1,3-dithiane,
2-di[p-ethoxyphenyl]methylol)-1,3-dithiane,
2-(di[N,N-dimethyl β-amino p-ethoxyphenyl]methylol)-
  1,3-dithiane, and 2-(di[β-morpholino p-ethoxyphenyl]
  methylol)-1,3-dithiane.

EXAMPLE III

To a suspension of 2-(di[p-methoxymethyleneoxy phenyl]methylol)-1,3-dithiane, (4.2 g., 10 mmoles) and pyridine (20 ml.) a mixture of thionyl chloride (1.2 g., 10 mmoles) and pyridine (5 ml.) is slowly added. The resulting mixture is allowed to stand for 1 hour at room temperature, then it is poured into a mixture of 50 ml. of ice water and 50 ml. of chloroform. After the mixture is thoroughly shaken, the chloroform layer is removed, washed with water to neutrality, dried over sodium sulfate and evaporated under reduced pressure to yield 2-(4',4''-di[methoxymethyleneoxy]benzhydrylidene) - 1,3-dithiane.

Similarly, by utilizing the compounds prepared in Example I as starting materials in the above process, the following novel compounds are obtained:

2(p,p'-dimethoxy benzhydrylidene)-1,3-dithiane,
2(p,p'-dimethoxy benzhydrylidene)-5-methyl-1,3-
  dithiane,
1-methyl 4-(p,p'-dimethoxy benzhydrylidene)-1,3,5-
  dithiazine,
4(p,p'-dimethoxy benzhydrylidene)-1,3,5-oxadithiane,
2(p,p'-dimethoxy benzhydrylidene)-1,3,5-trithiane,
2(p,p'-di[N,N-diethyl β-aminoethoxy]benzhydrylidene)-
  1,3-dithiane,
2-(p,p'-di[N,N-diethyl β-aminoethoxy]benzhydrylidene)-
  5-methyl-1,3-dithiane,
1-methyl 4-(p,p'-di[N,N-diethyl β-aminoethoxy]benz-
  hydrylidene)-1,3,5-dithiazine,
4-(p,p'-di[N,N-diethyl β-aminoethoxy]benzhydrylidene)-
  1,3,5-oxadithiane, and
2-(p,p'-di[N,N-diethyl β-aminoethoxy]benzhydrylidene)-
  1,3,5-trithiane.

EXAMPLE IV

Five grams of 2(p,p' - di[methoxy - methyleneoxy] benzhydrylidene) - 1,3,5 - trithiane, which is prepared from 2 - (di[p - methoxymethyleneoxy]methylol) according to the process of Example III, is added to a 100 ml. solution of 10% aqueous acetic acid. The mixture is allowed to stand for 4 hours at room temperature and then it is reduced to dryness under vacuum at 50° C. to yield 2-(p,p'-dihydroxybenzhydrylidene)-1,3,5-trithiane.

EXAMPLE V

By employing the p - methoxymethylenedioxy compounds and the p-methoxy compounds of Examples I, II and III as starting materials in the process of Example IV, the following compounds are obtained:

2-(di[p-hydroxyphenyl]methylol)-1,3-dithiane,
2-(di[p-hydroxyphenyl]methylol)-5-methyl-1,3-dithiane,
1-methyl 4-(di[p-hydroxyphenyl]methylol)-1,3,5-di-
  thiazine,
4-(di[p-hydroxyphenyl]methylol)-1,3,5-oxadithiane,
2-(di[p-hydroxyphenyl]methylol)-1,3,5-trithiane,
2-(p,p'-dihydroxybenzhydrylidene)-1,3-dithiane,
2-(p,p'-dihydroxybenzhydrylidene)-5-methyl-1,3-di-
  thiane,
1-methyl 4-(p,p'-dihydroxybenzhydrylidene)-1,3,5-
  dithiazine,
4-(p(p'-dihydroxybenzhydrylidene)-1,3,5-oxadiane and
2-(p,p'-dihydroxybenzhydrylidene-1,3,5-trithiane.

EXAMPLE VI

Five grams of 2 - (p,p' - dihydroxybenzhydrylidene)-1,3 - dithiane is added to a suspension of N,N' - diethyl 2-chloroethylamine (10 g.), sodium carbonate (5 g.) and dry acetone (100 ml.). The mixture is stirred for 1 hour at room temperature. It is then reduced to dryness and the residue is taken up in benzene, washed with water to neutrality, dried over sodium sulfate and evaporated to dryness to yield 2 - (p,p' - di[N,N - diethyl β - aminoethoxy]benzhydrylidene)-1,3-dithiane.

Similarly by utilizing N,N - dimethyl 2 - chloroethylamine, 1 - chloro - 2 - pyrrolidino ethane, 1 - chloro - 2 - piperidino ethane, 1 - chloro - 2 - piperazino ethane, 1-chloro - 2 - morpholino ethane, or chloroethane, in place of N,N' - diethyl 2 - chloroethylamine in the above process, the following compounds are respectively obtained:

2-(p,p'-di[N,N-dimethyl β-aminoethoxy]benzhydryl-
  idene)1,3-dithiane,
2-(p,p'-di[β-pyrrolidinoethoxy]benzhydrylidene)-1,3-
  dithiane,
2-(p,p'-di[β-piperidino ethoxy]benzhydrylidene)-1,3-
  dithiane,
2-(p,p'-di[β-piperazino ethoxy]benzhydrylidene)-1,3-
  dithiane,
2-(p,p'-di[β-morpholinoethoxy]benzhydrylidene)-1,3-
  dithiane, and
2-(p,p'-diethoxybenzhydrylidene)-1,3-dithiane.

EXAMPLE VII

By employing 2 - (di[p - hydroxyphenyl]methylol)-1,3-dithiane as the starting material in place of 2-(p,p'-dihydroxybenzhydrylidene) - 1,3 - dithiane in the process of Example VI the following compounds are obtained:

2-(di[N,N-diethyl β-amino-p-ethoxyphenyl]methylol)-
  1,3-dithiane,
2-(di[N,N-dimethyl β-amino-p-ethoxyphenyl]methylol)-
  1,3-dithiane;
2-di[β-pyrrolidino p-ethoxyphenyl]methylol)-1,3-
  dithiane,
2-(di[β-piperidino p-ethoxyphenyl]methylol)-1,3-
  dithiane,
2-(di[β-piperazino p-ethoxyphenyl]methylol)-1,3-
  thiane,
2-(di[β-morpholino p-ethoxyphenyl]methylol)-1,3-
  thiane, and
2-(di[ethoxyphenyl]methylol)-1,3-dithiane.

EXAMPLE VIII

To a suspension of 5 g. of 2-(p,p'-dihydroxy benzhydrylidene)-1,3-dithiane in 25 ml. of acetone is added a solution of 70 g. of potassium hydroxide in 37.5 ml. of water and the stirred mixture is treated dropwise with 10 ml. of dimethyl sulfate. The mixture is stirred for an additional 45 minutes and then poured into dilute hydrochloric acid. The solid which forms is collected by filtration and dried to yield 2 - (p,p' - dimethoxybenzylhydrylidene) - 1,3 - dithiane which is recrystallized from chloroform:methanol.

Similarly 2 - (p,p' - dimethoxybenzhydrylidene) - 1-benzyl - 1,3,5 - dithiazine and 2 - (p,p' - dimethoxybenzhydrylidene) - 1 - ethyl - 1,3,5 - dithiazine are prepared respectively from 2 - (p,p' - dihydroxybenzhydrylidene)-1 - benzyl - 1,3,5 - dithiazine and 2 - (p,p' - dihydroxybenzhydrylidene) - 7 - ethyl - 1,3,5 - dithiazine by the method of the above process.

What is claimed is:
1. The compound of the formula:

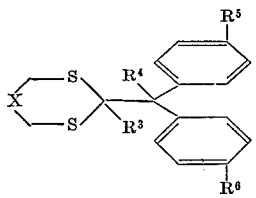

wherein

X is —CH$_2$—, —O—, or —S—;
R$^3$ is hydrogen;
R$^4$ is hydroxy;
R$^3$ and R$^4$ taken together comprise a double bond between their adjacent carbon atoms; and
each of R$^5$ and R$^6$ is hydroxy, (lower) alkoxy of from 1 to 5 carbon atoms, β-(N,N-dimethylamino)ethoxy, β-(N,N-diethylamino)ethoxy, β-pyrrolidinoethoxy, β-piperazinoethoxy, β-piperidinoethoxy, β-morpholinoethoxy; tetrahydrofuran-2'-yloxy or tetrahydropyran-2'-yloxy.

2. The compound according to claim 1 wherein each of R$^5$ and R$^6$ is hydroxy, methoxy, ethoxy, β-(N,N-dimethylamino)ethoxy, β-(N,N-diethylamino)ethoxy, β-pyrrolidinoethoxy, or β-morpholinoethoxy.

3. The compound according to claim 1 wherein R$^3$ and R$^4$ taken together comprise a carbon-carbon double bond between their adjacent carbon atoms.

4. The compound according to claim 1 wherein
R$^3$ is hydrogen; and
R$^4$ is hydroxy.

5. The compound according to claim 3 wherein X is —CH$_2$—; and R$^5$ and R$^6$ are each hydroxy, methoxy or β-(N,N-diethylamino)ethoxy.

6. The compound according to claim 3 wherein X is —O—; and R$^5$ and R$^6$ are each hydroxy, methoxy or β-(N,N-dimethylamino)ethoxy.

7. The compound according to claim 3 wherein X is —S—; and R$^5$ and R$^6$ are each hydroxy, methoxy or β-(N,N-diethylamino)ethoxy.

8. The compound according to claim 4 wherein X is —CH$_2$—; and R$^5$ and R$^6$ are each hydroxy, methoxy or β-(N,N-diethylamino)ethoxy.

9. The compound according to claim 4 wherein X is —O—; and R$^5$ and R$^6$ are each hydroxy, methoxy or β-(N,N-diethylamino)ethoxy.

10. The compound according to claim 4 wherein X is —S—; and R$^5$ and R$^6$ are each hydroxy, methoxy or β-(N,N-diethylamino)ethoxy.

References Cited

Corey et al., Angew. Chem., Internatl. Ed., vol. 4 (1965), pp. 1075–6.

JAMES A. PATTEN, Primary Examiner

U.S. Cl. X.R.

260—243, 247.1, 268, 293.4, 326.5, 326.84, 999

UNITED STATES PATENT OFFICE
CERTIFICATE OF CORRECTION

Patent No. 3,525,751    Dated August 25, 1970

Inventor(s) John H. Fried

It is certified that error appears in the above-identified patent and that said Letters Patent are hereby corrected as shown below:

Column 6, line 7, "oxadiane" should read -- oxadithiane --.

Column 8, line 9, "β-(N,N-dimethylamino)ethoxy" should read -- β-(N,N-diethylamino)ethoxy --.

Signed and sealed this 31st day of August 1971.

(SEAL)
Attest:

EDWARD M. FLETCHER, JR.    ROBERT GOTTSCHALK
Attesting Officer    Acting Commissioner of Patents